(12) United States Patent
Lu et al.

(10) Patent No.: US 7,818,209 B1
(45) Date of Patent: Oct. 19, 2010

(54) BEST PRICE SEARCH ENGINE INCLUDING COUPONS

(75) Inventors: Charles Lu, Fremont, CA (US); Sadashiv Adiga, Hercules, CA (US)

(73) Assignee: Campusi, Inc., Fremont, CA (US)

( * ) Notice: Subject to any disclaimer, the term of this patent is extended or adjusted under 35 U.S.C. 154(b) by 1309 days.

(21) Appl. No.: 10/632,557

(22) Filed: Jul. 31, 2003

(51) Int. Cl.
*G06F 17/60* (2006.01)
(52) U.S. Cl. ............... 705/14.54; 705/14.13; 705/14.24; 705/14.29
(58) Field of Classification Search .............. 705/14, 705/14.13, 14.24, 14.29, 14.54
See application file for complete search history.

(56) References Cited

U.S. PATENT DOCUMENTS

| | | | |
|---|---|---|---|
| 6,266,649 B1 * | 7/2001 | Linden et al. | 705/26 |
| 6,491,217 B2 * | 12/2002 | Catan | 235/375 |
| 6,701,350 B1 * | 3/2004 | Mitchell | 709/217 |
| 6,748,447 B1 * | 6/2004 | Basani et al. | 709/244 |
| 6,785,671 B1 * | 8/2004 | Bailey et al. | 707/3 |
| 6,792,460 B2 * | 9/2004 | Oulu et al. | 709/224 |
| 7,113,917 B2 * | 9/2006 | Jacobi et al. | 705/14 |
| 2001/0014868 A1 * | 8/2001 | Herz et al. | 705/14 |
| 2002/0133400 A1 * | 9/2002 | Terry et al. | 705/14 |
| 2003/0069785 A1 * | 4/2003 | Lohse | 705/14 |
| 2004/0098377 A1 * | 5/2004 | Kraft | 707/3 |
| 2004/0176997 A1 * | 9/2004 | Podgurny et al. | 705/14 |
| 2005/0149377 A1 * | 7/2005 | Schierholt | 705/10 |

OTHER PUBLICATIONS

IBM Technical Disclosure Bullitin, Sep. 2001 Issue No. 449, p. 1534; A Method for Location-Based Comparison Shopping NNRD44980; 20010901.*

* cited by examiner

*Primary Examiner*—James W Myhre
*Assistant Examiner*—Michael Goldman
(74) *Attorney, Agent, or Firm*—Raj Abhyanker, P.C.

(57) ABSTRACT

Finding a best price available for a selected product, computed including all relevant factors available to the search engine. Searching separately for the product by price, and concurrently, searching for any available coupons or other discounts available for that product from the seller. When obtaining price information, querying for relevant information relating to purchase decisions. Obtaining relevant information from third-party sources. When obtaining discount information, querying for relevant information relating to applicability of that discount. Matching price information with coupon information for each selected requested product, and computing an effective price to the potential buyer. Aggregating the information it obtains, and presenting that aggregated information. Filtering or sorting those results. Maintaining separate pricing information for each product, uniquely identified by a code, in a database entry. Maintaining separate information for each discount. Augmenting this information by hand. Matching pricing information with discount information.

23 Claims, 3 Drawing Sheets

BEST PRICE SEARCH ENGINE INCLUDING COUPONS

BACKGROUND OF THE INVENTION

1. Field of the Invention

The invention relates to a "best price" search engine, that allows for use of "smart coupons," such as might be used in e-commerce.

2. Related Art

Commerce conducted using computer networks can involve e-commerce, such as using web sites for promotion of goods, databases for maintaining goods and their prices, and communication between buyer and seller to conduct a sale. In e-commerce, it is often advantageous, to the potential buyer at least, to find the best price available for the same goods, where those goods can be compared between distinct sellers. For example, books are often identified using a known code, such as for example an ISBN number, that both identifies the selected book as a unique item for sale, and matches that unique item between distinct sellers. This has the effect that it is possible to compare prices for selected individual books and present information to a user regarding those prices, with the effect that the user can select their choice of where to purchase those selected books. Sellers of books are often referred to herein as "bookstores," even when there is no physical location that might be regarded as the "store."

A first problem with known systems for price searching is that there are often multiple aspects to the nature of the goods to be purchased, including for example delivery time and quality (such as for example "new" or "used" condition). This can be applicable even when the goods are uniquely identifiable, such as with books, because although the title and edition might be identical, the quality (new or used, and if used, with what degree of wear and tear) and delivery time (which might depend strongly on a selected method for shipping) might be substantially different, and thus might present substantially different perceived utility to the potential buyer. Moreover, distinct sellers might present information regarding price and other factors different formats, with the effect that such searches involve either intelligent interpretation of the information, or alternatively, relatively difficult computation in parsing the web site presentation for desired information. There are a relatively large number of possible sellers (over 500 known to be reachable online in the United States alone), and many of them are relatively unknown to the casual potential buyer, with the effect that such searches cannot easily be conducted "by hand."

A second problem with known systems is that there are sometimes discounts, promotions, and other price reductions available to the user, with which the user is not necessarily familiar with, and which would affect the final price. For a first example, a designated bookstore might be advertising a sale on selected books, or for orders exceeding a selected amount. This information, in the price database for that bookstore, might not be associated with any identification for the selected book. For a second example, a designated bookstore might be advertising free shipping for a selected time, or for orders exceeding a selected amount. Similarly, this information, in the price database for that bookstore, might not be associated with any identification for the selected book. Also similarly to pricing information, distinct sellers might present information regarding coupons or discounts in different formats or at different locations within their web sites (or this information might be available using other channels entirely, such as for example other web sites, email advertising, or print advertising), with the effect that such searches involve either intelligent interpretation of the information, or alternatively, relatively difficult computation in parsing the web site presentation for desired information. There are typically a relatively large number of possible coupons or discounts, of which many of them require at least some review of the product and computation of the effective price reduction, with the effect that such searches also cannot easily be conducted "by hand."

Accordingly, a simple search for lowest stated price might not deliver sufficient information regarding how the product can be purchased at least effective price.

A third problem with known systems for price searching, and for searching in general, is the trade-off between the amount of time allowed for response from a website with a possible search "hit," and the amount of time allowed to respond to the potential buyer with search results. For example, if a selected bookstore has a web server that is slow to respond, or even unavailable, that bookstore might end up excluded from the search results if a relatively low threshold for response time is used. This problem is exacerbated if the book being searched for is relatively popular, even temporarily, such, as for example at the time of release for the book, or such as for example at the beginning of a school term for class textbooks and workbooks. As noted above, there are a relatively large number of possible sellers, and many of them are relatively unknown to the casual potential buyer, with the effect that setting parameters for response time for such searches cannot easily be tailored to each specific potential buyer.

Accordingly, it would be advantageous to provide an improved technique less subject to problems with known systems.

SUMMARY OF THE INVENTION

The invention provides a method and system capable of finding a best price available for a selected product, where the best price is computed including all relevant factors available to the search engine, including for example coupons (or other discounts), currency exchange rates, qualify (as determined in response to preferences selected by the potential buyer), quantity desired, and shipping costs (similarly, as determined in response to preferences selected by the potential buyer).

In one embodiment, the system searches separately for the product by price, and concurrently, searches for any available coupons or other discounts available for that product from the seller. When obtaining price information from the potential seller, the system also queries that seller for all relevant information relating to purchase decisions, such as for example condition or quality, shipping options, and applicable sales taxes. The system might also obtain relevant information from third-party sources, such as for example today's currency exchange rates for the currency in which the price is denominated. When obtaining coupon or discount information from the potential seller, the system also queries that seller for all relevant information relating to applicability of that coupon or discount, such as for example, applicability to specific classes of books, a minimum order, amount that must be exceeded, applicability to a specific type of shipping, time start and end for the coupon or discount, and whether the coupon or discount is computed as a fixed amount of price reduction or as a percentage price reduction. The system matches price information with coupon information for each selected book (or other product) requested by the potential buyer, and in response thereto, computes an effective price that the potential buyer would have to pay after all relevant factors are taken into account.

For one example, not intended to be limiting in any way, a book available at a first bookstore for $50, but with 10% off orders exceeding $25 and with free shipping within a selected range of locations (for which the potential buyer qualifies), would have an effective price to the potential buyer of $45, while the same book available at a second bookstore for $40, but with a $5 shipping charge and a 5% in-state sales tax (which would be applied to the potential buyer), would have an effective price to the potential buyer of $47; that is, the lowest available price would not be the same as the lowest effective price.

The system aggregates the information it obtains regarding those sellers offering the product, and presents to a potential buyer that aggregated information, sorted (in one embodiment) by least effective cost, that is, when computation of the effective cost is taken into account, including information about aspects of that cost such as stated price, applicable coupons, shipping charges, and currency exchange rates. This has the effect that the potential buyer is able to select a seller of choice, either in response to least effective cost, or in response to other factors known to the user, such as for example reputation of the seller or shipping response time. In one embodiment, the user might filter or sort the results to restrict them to selected requirements, such as for example a designated quality of the product or a designated shipping response time.

In one embodiment, the system include a web crawler capable of searching for available coupons and other promotional information, either automatically or in response to a search directed by an operator. The system maintains information regarding those available coupons and other promotional information in a database, including information sufficient for matching those available coupons and other promotional information with individual products possibly later selected by the user for possible purchase. For example, some coupons might be time limited (with a designated start time or end time), or might apply to specific products or categories of products, or might apply only when a designated volume of products is purchased. In one embodiment, this information might be augmented by additional information entered by operators, such as for example, coupons or discounts known to be available from review of print media, handbills or flyers, or announcements received in the mail.

The system maintains separate information for each product, uniquely identified by a system generated code, similar to an ISBN number for books, another unique ID for CDs (compact disks), or another unique ID for a different type of product. For each such product, the system maintains information in a database entry for that product, regarding all relevant information regarding price, including the stated price, the denominated currency, the condition of the product (for example, new or used, and if used, with what degree of wear and tear), the shipping options and other delivery time information available for the product (for example, how quickly the bookstore can locate the product and begin shipping, and how quickly the shipper can deliver the product to the potential buyer at their designated location), and the like. The system also maintains separate information for each discount, each also uniquely identified by a code, typically assigned by the system in response to a source of information for that specific discount.

This has the effect that the system can match, in a cross-matching table, each possible product against each possible discount, along with all information relevant to purchase of that product. One such effect is that the system can determine which discounts are available at which sellers, which discounts apply to which products, and what conditions are involved before the potential buyer can invoke the discount. In one embodiment, different versions of a product, different shipping options, and the like, are each maintained in the system databases as separately identifiable products, with the effect that if a coupon applies to only some versions of the product or only some shipping options (for example, the coupon might offer free 3-day shipping, but no discount on 1-day shipping), that information can be used when matching possible discounts with possible products. Similarly, a first discount might apply to a specific book available at any seller (for example, because the publisher of the book offers the discount), while a second discount might apply to any book available at a specific seller (for example, because the specific seller offers the discount). In one embodiment, the cross-matching table includes matching this information, with the effect that the potential buyer is presented only with discounts that might actually apply to the selected products.

In one embodiment, the system includes a high-speed web crawler, capable of minimizing the amount of time involved in search while concurrently obtaining a best-quality search within those constraints. The high-speed web crawler includes techniques including at least the following:

dead link detection—When searchable sellers are determined to have links that are dead or very slow, the high-speed web crawler maintains identifiers for those searchable sellers on a "do not crawl" list. A default TTL (time to live) value for prices for a selected searchable seller is preferably about 30 minutes, with the effect that for that time, the high-speed web crawler will not attempt to search that seller at all. After the TTL has expired, another attempt is made to see if the link to the searchable seller is available within a reasonable time.

pre-fetching pricing data—Some searchable sellers allow information to be obtained in advance of an actual search. For one example, not intended to be limiting in any way, some searchable sellers are willing to provide daily (or more frequent) pricing updates for a substantial portion of their searchable database. These the high-speed web crawler checks these pre-fetched pricing data before attempting to contact the searchable seller for an actual search, with the effect that it may not be necessary to search that seller at all.

pre-opened connections—The high-speed web crawler maintains a number of open connections, such as for example open TCP/IP sockets and persistent HTTP connections, to searchable sellers. In one embodiment, the high-speed web crawler includes a cluster of several (in one embodiment, more than 10) devices, with the effect that the high-speed web crawler is capable of conducting searches of multiple sellers, in parallel. In one embodiment, the high-speed web crawler conducts multiple HTTP requests concurrently or in parallel, with the effect of substantially reducing aggregate search response time. In one embodiment, pre-opened connections include at least: (a) pre-fetched DNS information, (b) pre-opened TCP/IP sockets, and (c) pre-opened TCP/IP connections.

pre-searched products—The high-speed web crawler maintains a selection of "popular" products, that is, products for which the most searches have been requested by buyers in a recent time duration (such as for example, the most recent day). At times when there is little other activity, such as for example at night or at other times of low traffic, the high-speed web crawler pre-searches prices and discounts for those products and maintains search results in a relatively local database for substantially immediate response. In one embodiment, the most popular 10,000 books are pre-searched overnight, with, the effect that prices and discounts are available for those most popular 10,000 books each morning without further search.

adaptive TTL for selected sellers—The high-speed web crawler maintains a selected TTL value for pricing and discount information for each searchable seller independently, with the effect that searchable sellers whoa update their prices more frequently are searched more frequently, and with the effect that searchable sellers who update their prices less frequently are searched less frequently. The inventors have found that TTL values for pricing are a useful proxy for alacrity of response from the seller. The high-speed web crawler maintains non-expired pricing and discount information in a relatively local database for substantially immediate response, with the effect that non-expired pricing and discount information need not be further searched at all.

After reading this application, those skilled in the art would recognize that the invention includes an enabling technology by which substantial advance is made in the art of intelligent searching. For example, the invention might be used to provide one or more of, or some combination or extension or mixture of, any of the following:

Searching for not necessarily identical products or services, where the features of each product or service might be comparable, and where it is possible to determine the effective price for a product or service having a minimal set of features desired by the potential buyer. For example, not intended to be limiting in any way, cellular phones might be identifiable by their features, and a first model cellular phone having features A, B, and C, and an effective cost of $50, would be preferable to a second model cellular phone having features A, B, C, and D, and an effective cost of $75, where the potential buyer has indicated lack of interest in feature D. This would have the effect that purchasing the first model would be least effective cost for the purposes of that specific potential buyer.

Searching for packages of multiple products or services, where the search is tailored to a combined effective price that is minimized for the entire package. For example, not intended to be limiting in any way, a set of books A, B, and C, might be available at a single location at a stated price of $100 with a discount for purchases over $80 of 10% and free shipping for more than 2 books, for an effective combined price of $90, while the individual books might be available for less at other sellers, but with a combined price (for the minimum effective price of A individually, the minimum effective price of B individually, and the minimum effective price of C individually) of $80, but with no volume discount and total shipping charges of $12, for an combined effective price of $92. This would have the effect that purchasing all 3 books at one location is less expensive than purchasing them individually at their least cost apiece.

Although described primarily with regard to books and CDs, a primarily with regard to price searching, the invention is not limited to those specific products, features, or those implementations described herein.

DETAILED DESCRIPTION OF THE PREFERRED EMBODIMENT

In the description herein, a preferred embodiment of the invention is described, including preferred process steps and data structures. Those skilled in the art would realize, after perusal of this application, that embodiments of the invention might be implemented using a variety of other techniques not specifically described, without undue experimentation or further invention, and that such other, techniques would be within the scope and spirit of the invention.

Lexicography

The general meaning of each of these following terms is intended to be illustrative and in no way limiting.

The phrases "web site" and "web server" describe systems coupled to the World Wide Web (also referred to herein as the "web"), or a variant thereof, capable of being accessed by anyone with access to the web, or systems including computer programs that serve files or dynamic contents that form web pages to web users or computer programs that request them.

The phrases "stated price" and "best price" and "effective price" describe a price listed by the seller, a lowest price for the product, and a price representing a total cost to the buyer.

The term "database" describes any collection of data capable of, or organized for, electronic storage and retrieval on demand.

The phrases "same goods" and "unique item for sale" describe items that are Substantially identical in nature to that being sought by a buyer, or describe a substantially specific or substantially uniquely identifiable item offered for sale.

The term "seller" describes any entity that has an item for sale.

The terms "bookstore" describes any entity, such as for example a firm or individual, storing or offering books (and possibly other items) for sale.

The phrase "present information" describes presenting data in a way to be meaningful to a buyer or seller in the context of a buying or selling decision.

The phrases "price searching" and "web crawler" describe any process of searching for information related to a price or cost of an item of interest, or any process of searching web sites and related computer programs or databases for desired information.

The phrases "delivery time" and "shipping method" describe an amount of time (preferably measured as a number of days) involved in delivering a product from a seller (or a related fulfillment entity) to a buyer, and a mode or method by which delivery is performed.

The terms "condition" or "quality" (such as for example "new" or "used" condition) describe a set of characteristics of the goods or products deemed relevant for searching, in response to an intent of the buyer or seller, or describe a set of system heuristics used in comparison or computation of a price for those goods or products.

The phrase "perceived utility" describes usefulness as presented to a user. It is responsive to a set of factors considered for making a purchase, some of which might be obvious and previously known to the buyer, and some of which might not be so obvious.

The phrase "different formats" describes different sets of methods including different sets of attributes used to describe a product or its features.

The phrases "intelligent interpretation of the information" and "computation in parsing the web site presentation" describe an effort or a set of techniques involved with identifying attributes of interest or relevance to identification of product and comparisons or computations of its price.

The phrase "by hand" describes use of human intelligence involved with substantially manual operations.

The terms "coupons," "discounts," "promotions," and the phrase "price reduction" describe some of the factors involved with or affecting (such as for example reducing) a stated price of the product.

The term "search" generally describes a step of reading or attempting to read information at an information source (such as for example, a seller's web site or web page or database, whichever is accessible for searching).

The phrase "search result" generally describes a result of a search of one information source, or a set of searches of multiple information sources.

The phrase "search hit" generally describes a result of a search Of one information source resulting in finding the information searched for, such as for example a specific object offered for sale.

The phrase "response time" generally describes a time elapsed from a time a buyer sends request for a price to a time when the buyer receives information regarding that price. In one embodiment, "response time" is used to refer generally to a result of a search of multiple information sources, and the aggregation of search results into an aggregate response.

The phrases "relevant factors" and "relevant information relating to purchase" and "relevant information relating to applicability of that coupon or discount" describe attributes or characteristics of information, specific information involved in making a purchase decision and the information involved in checking the validity of a coupon or discount such as price of a book, condition of a book or location of buyer, or other such information.

The phrase "third-party source" describes a party that might supply information needed to help a buyer make a purchase or compute an effective price. In one embodiment, this information might not be available on the seller's web site or readily available to the buyer, and involves having the system glean that information from a source other than the buyer or the seller.

The phrase "fixed amount of price reduction" generally describes a numeric value to be deducted from the price independent of the amount of stated price. The phrase "as a percentage price reduction" a numeric value to be deducted from the price whose value is responsive to a total amount of the stated price, such as for example a fixed fraction (for example, 10%) of that total amount of the stated price.

The phrase "aggregated information" describes information related to purchase collected from more than one source of such information (such as, for example, a buyer, a seller, any third parties), and aggregated for presentation to the buyer.

The phrase "reputation of the seller" generally describes information relating to the quality or character of the seller, such as for example as determined by people who do business with the seller, or such as far example as determined by a third party (such, as a professional rating service or other source).

The term "operator" generally describes any entity or person who initiates or conducts a search and or purchase, including for example any persons who operate a device connected to the network or the web and capable of those functions.

The phrase "denominated currency" generally describes a currency, named or designated as the currency in which the stated price is measured.

The phrase "shipping options and other delivery time information (for example, how quickly the bookstore can locate the product and begin shipping, and how quickly the shipper can deliver the product to the potential buyer at their designated location)" generally describes the methods of delivering the product from seller to the buyer and time required to execute that delivery.

The phrase "match, in a cross-matching table" generally describes a step of attempting to find values for factors (whether described, preferred, or required) named by a buyer, and match those values in a set of information (such as for example a set of computed or stored values). In one embodiment, the step of matching is performed with the effect of supporting a comparison of effective price or a purchase decision. Depending on context here, this phrase can also refer to a successful match, or to a result of such a match.

The phrase "not necessarily identical products or services, where the features of each product or service might be comparable" generally describes a set of products or services that share common traits or features.

The phrase "minimal set of features" generally describes a smallest set of attributes or characteristics (whether described, preferred, or required) named by a buyer for a specific good or service.

The phrase "system generated unique product ID" generally describes an identifying code capable of being generated by a system in response to a set of disparate information about a good or service, with the effect of being capable of uniquely identifying that good or service, such as when used in a price comparison step.

The phrase "packages of multiple products or services, where the search is tailored to a effective combined price" generally describes a concept in which an effective price might be computed in response to a set of more than one good or service, whose collective purchase might be different from individual purchase. For one example, not intended to be limiting in any way, if a buyer were to attempt to purchase all known "Harry Potter" books, it might be possible to obtain a lower effective price (after computing shipping) for purchasing them as a group, rather than purchasing them from disparate sources.

The scope and spirit of the invention is not limited to any of these definitions, or to specific examples mentioned therein, but is intended to include the most general concepts embodied by these and other terms.

System Elements

Figure 1:
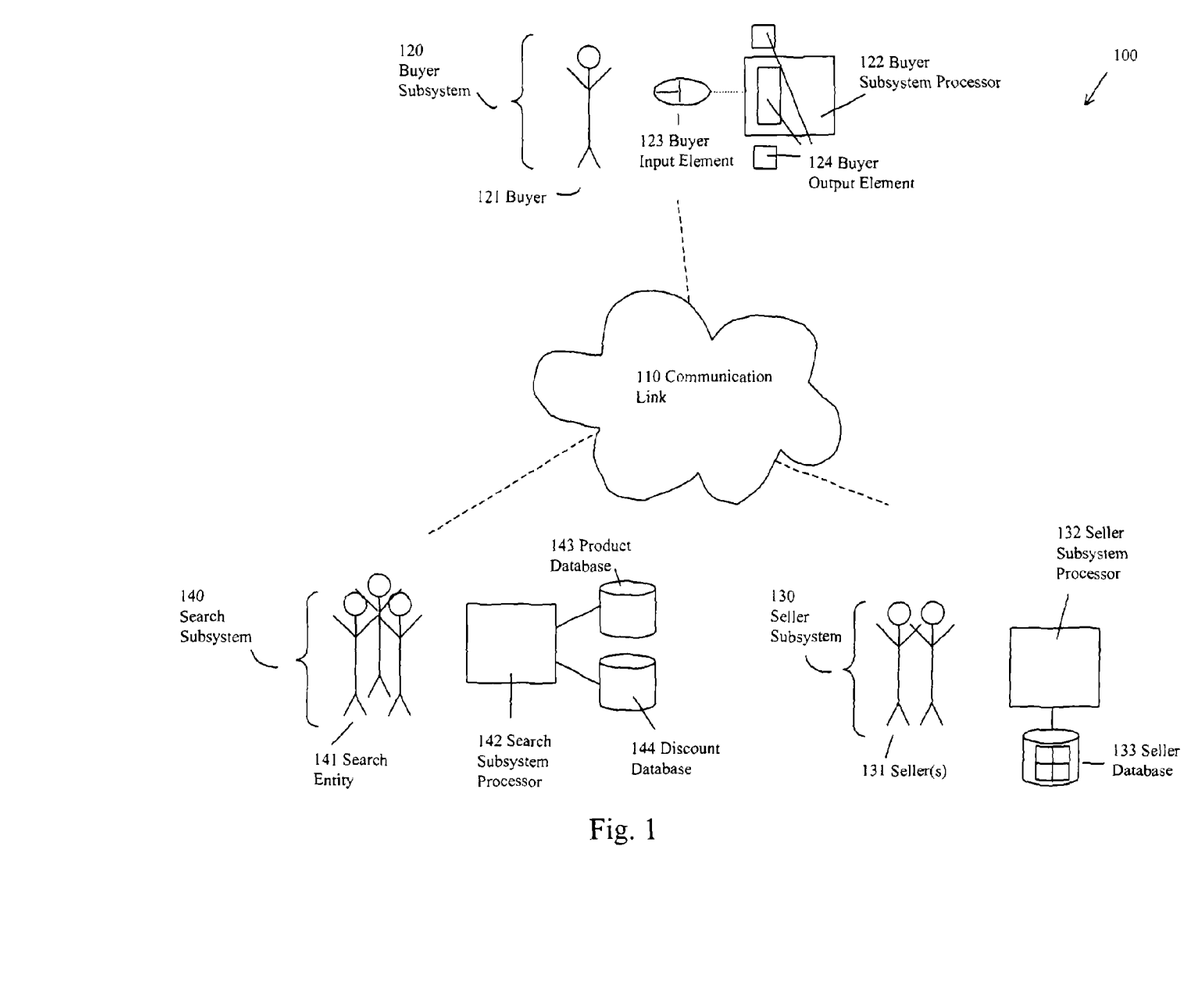
FIG. 1 shows a block diagram of a system including a best price search engine.

FIG. 1 shows a block diagram of a system including a best price search engine.

A system 100 includes a communication link 110, a buyer subsystem 120, a set of seller subsystems 130, and a search subsystem 140.

The communication link 110 includes any technique capable of delivering information from senders to receivers. In one embodiment, the communication link 110 includes a computer network, such as for example the Internet, operating using known communication protocols, such as for example TCP/IP, HTTP, SSL over secure HTTP, and variants thereof. However, in alternative embodiments, the communication link 110 might include other known techniques for communication, such as for example a computer BBS (Bulletin Board System) or the use of TELNET or FTP to couple the seller subsystems 130 to the search subsystem 140.

Buyer Subsystem

The buyer subsystem 120 is associated with one or more potential buyers 121, and includes a buyer subsystem processor 122, program and data memory, a buyer input element 123, and a buyer output element 124.

Although the potential buyer 121 is described herein as an individual natural person, it is possible for the potential buyer 121 to include a business entity, an organization or other group of people. It is also possible for the potential buyer 121 to include a computer program operating under instructions to perform some or all of the functions attributed to an intelligent natural person, or an Artificial Intelligence program or other system with the capability of initiating requests and interpreting responses thereto.

The buyer input element 123 is capable of receiving commands, information, and instructions from the potential buyer 121. In one embodiment, the buyer input element 123 includes a keyboard and a pointing device, such as a mouse or touch pad, capable of providing key presses and mouse clicks or drags, interpretable by the buyer subsystem processor 122. However, in alternative embodiments, the buyer input element 123 may include alternative techniques for information input, including for example a telephone keypad, a voice recognition system, a handwriting or graffiti recognition system, or a combination or conjunction thereof. The buyer subsystem 120 includes software instructions capable of being interpreted by the buyer subsystem processor 122 to parse and respond to those commands, information, and instructions, and to deliver those commands, information, and instructions from the potential buyer 121 using the buyer input element 123, to other elements of the system 100 using the communication link 110. In one embodiment, the buyer input element 123 is coupled to the search subsystem 140, using the communication link 110, and is capable of sending those commands, information, and instructions to the search subsystem 140 for action thereon.

The buyer output element 124 is capable of receiving responses and other information from the other elements of the system 100 using the communication link 110, and presenting those responses and other information to the potential buyer 121. In one embodiment, the buyer output element 124 includes a monitor or flat screen display, and a set of audio speakers. Similarly, the buyer subsystem 120 includes software instructions capable of being interpreted by the buyer subsystem processor 122 to parse and present those responses and other information. In one, embodiment, the buyer subsystem 120 presents search results in a tabular form, or any other form convenient for the potential buyer 121 (such as for example, a sequence of XML capable of being interpreted by a web browser for presentation, or by a database or Artificial Intelligence program for maintenance or interpretation of the data therein).

Seller Subsystem

The seller subsystem 130 is associated with one or more potential sellers 131, and includes a seller subsystem processor 132, program and data memory, and a seller database 133.

Although the potential seller 131 is described herein as an individual bookstore, it is possible for the potential seller 131 to be a collection of such bookstores, a chain of bookstores, another business entity, an individual natural person or a group thereof (similar to the potential buyer 121). It is also possible for the potential buyer 121 to include a computer program operating, under instructions to perform some or all of the functions attributed to an intelligent natural person, or an Artificial Intelligence program or other system with the capability of initiating requests and interpreting responses thereto.

In one embodiment, the seller subsystem 130 includes a web server controlled by the subsystem processor 132, and coupled to the seller database 133. However, in alternative embodiments, the seller, subsystem 130 might include a BBS, or an element responsive to a TELNET connection (or other variant protocol). The seller subsystem 130 includes software instructions capable of being interpreted by the seller subsystem processor 122 to parse and respond to commands, information, and instructions from the buyer subsystem 120 and from the search subsystem 140.

The seller database 133 includes a set of web pages or other network objects capable of being presented by the web server included in the seller subsystem 130, in response to commands, information, and instructions from the buyer subsystem 120 or from the search subsystem 140. In one embodiment, the seller database 133 includes a set of entries including information regarding products available for sale by the potential seller 131, such as for example a set of entries each describing a unique book, as indexed by the ISBN for that book, or a unique CD, as indexed by a unique ID for that CD.

The seller database 133 also includes a set of information embedded in those web pages regarding purchases by potential buyers 121, including shipping options, taxes, and possible discounts available to those potential buyers 121, for selected books, for selected categories of books (such as for example "best sellers"), or for book orders meeting selected criteria (such as for example 10% off if the book order exceeds $100, or free 3-day shipping if the book order exceeds $50).

Search Subsystem

The search subsystem 140 is associated with a search entity 141, and includes a search subsystem processor 142, program and data memory, a product database 143, and a discount database 144.

Although the search entity 141 is described herein as an individual business entity, it is possible for the search entity 141 to be a collective, other organization, or other group of people or entities.

The search subsystem 140 is capable of receiving commands, information, and instructions from the potential buyer 121, and of receiving responses thereto and other information from one or more seller subsystems 130. The search subsystem 140 includes software instructions capable of being interpreted by the search subsystem processor 142 to parse and respond to those commands, information, and instructions from the potential, buyer 121, and of being interpreted by the search subsystem processor 142 to parse and forward responses thereto and other information from one, or more seller subsystems 130.

The search subsystem 140 includes a product database 143, in which the search subsystem 140 is capable of maintaining information about individual products (and variations thereof, such as those variations in response to condition or quality, or shipping options). Similarly, the search subsystem 140 includes a discount database 144, in which the search subsystem 140 is capable of maintaining information about individual discounts (and variations thereof, such as those variations in response to order size, or number of books ordered). The search subsystem 140 includes software instructions capable of being interpreted by the search subsystem processor 142 to match individual products in the product database 143 against individual discounts in the discount database 144, with the effect of determining for which products those discounts apply. The search subsystem 140 includes software instructions capable of being interpreted by the search subsystem processor 142 to compute an effective price for each product requested by the potential buyer 121, after application of relevant information including discounts, shipping options and costs, and taxes.

Although described as separate devices, in the context of the invention there is no particular requirement that the buyer subsystem 120 and the search subsystem 140 be separate devices, or even that they be isolated subsystems part of the same device. Rather, the buyer subsystem 120 and the search subsystem 140 are described herein as separate devices to illustrate the different functions each performs. In one embodiment, the buyer subsystem 120 and the search subsystem 140 might be collocated at a single hardware device, using software appropriate to the processes and data structures described herein.

Similarly, although described as separate devices, in the context of the invention there is no particular requirement that seller subsystems 130 and the search subsystem 140 be separate devices, or even that they be isolated subsystems part of the same device. Rather, the seller subsystems 130 and the search subsystem 140 are described herein as separate devices to illustrate the different functions each performs. In one embodiment, the seller subsystems 130 and the search subsystem 140 might be collocated at a single hardware device, using software appropriate to the processes and data structures described herein.

Method of Operation (Best Price Search)

Figure 2:
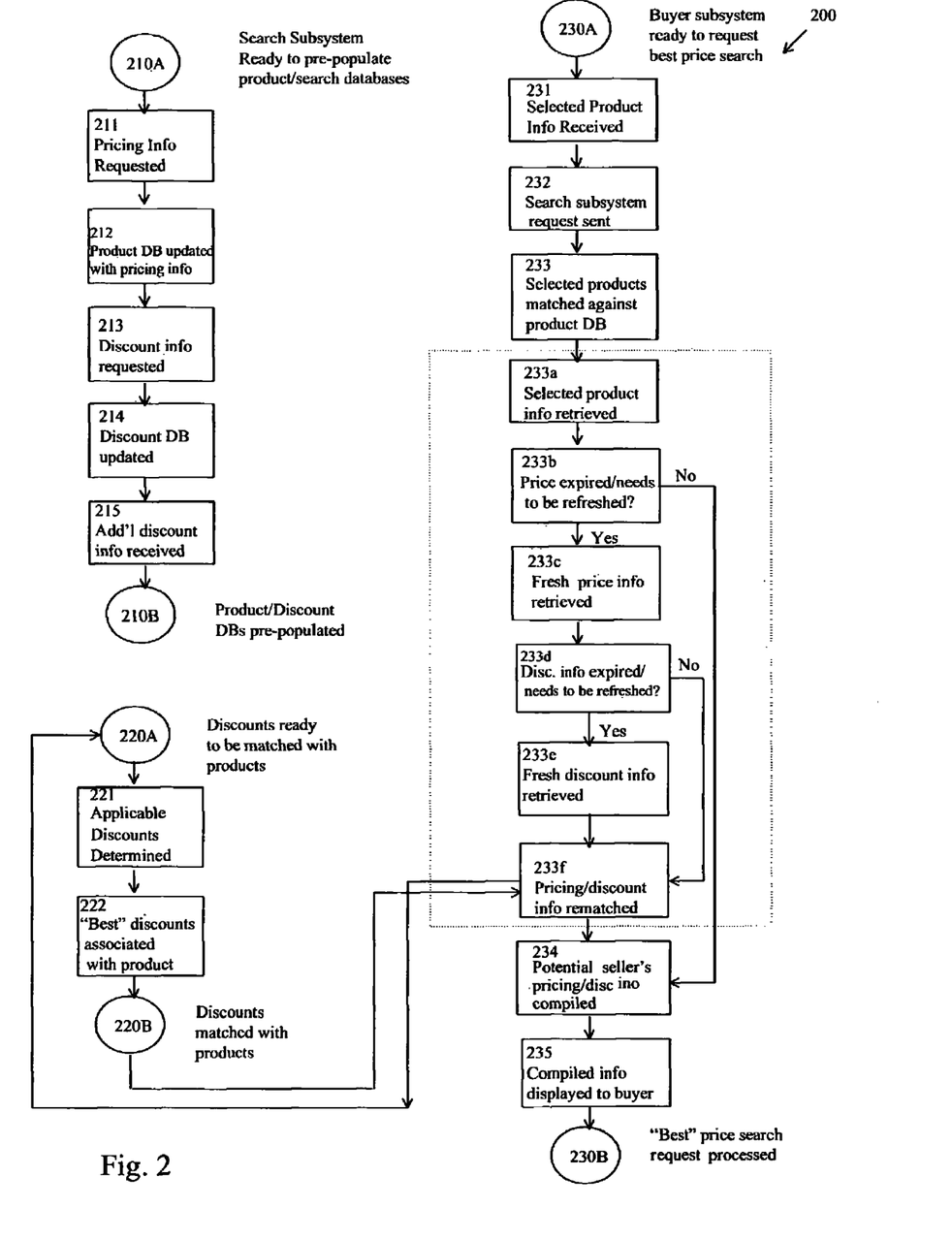
FIG. 2 shows a process flow diagram of a method including operation of a system including a best price search engine.

FIG. 2 shows a process flow diagram of a method including operation of a system including a best price search engine.

Although described serially, the flow points and method steps of the method 200 can be performed by separate elements concurrently, in conjunction, or in parallel, whether asynchronously or synchronously, in a pipelined manner, or otherwise. In the context of the invention, there is no particular requirement that the method must be performed in the same order in, which this description lists flow points or method steps, except where explicitly so stated.

Pre-Populating the Databases

At a flow point 210A, the search subsystem 140 is ready to pre-populate its product database 143 and its discount database 144.

At a step 211, the search subsystem 140 sends requests to each seller subsystem 130, requesting pricing information for each product known to the search subsystem 140. As part of this step, if the search subsystem 140 is aware that only a subset of those products are available at a particular seller subsystem 130, the search subsystem 140 only requests that particular seller subsystem 130 for pricing information for that subset of products.

In one embodiment, pricing information includes at least some of the following:

identifiers for the particular potential seller 131, the particular product (such as for example an ISBN for a book);
information about that particular product, including a location at the particular seller subsystem 130 at which to find information about that particular product (such as for example a URL for the page relating to that book), a location at the particular seller subsystem 130 at which to find specific pricing information about that particular product (such as for example a URL for the price of that book);
information about aspects of that product relating to pricing, including a currency for the prices described at that seller subsystem, and information regarding shipping and handling (such as for example a URL for the shipping options, costs and shipping time associated with that book, and a URL for any handling or packaging fee associated with that book); and
information about how quickly the information about that particular product is likely to change, such as for example a TTL (time: to live) value indicating how long that quoted price is still good.

In one embodiment, a set of identifiers for particular products are not necessarily ISBN values, but in addition or instead include a system generated unique product ID, independently generated by the search subsystem 140, in response to a set of information having multiple elements. The system generated unique product ID is responsive to a set of factors. For example, not intended to be limiting in any way, in the case of a CD or DVD, the system generated unique product ID might be responsive to (1) a title of the product, such as for example the CD or DVD "Cast Away," (2) an actor known to be featured in that CD, such as for example the actor Tom Hanks, (3) a director known to be associated with that CD or DVD, such as for example the director Robert Zemeckis, (4) a UPC code for that CD or DVD, such as for example the UPC code 024 543 017 905, (5) a studio known to be associated with that CD or DVD, such as for example the studio Sony, (6) a release date known to be associated with that CD or DVD, such as for example the date Jun. 12, 2001, (7) a format known to be associated with that CD or DVD, such as for example a DVD format, (8) a rating known to be associated with that CD or DVD, such as for example the rating PG-13, (9) a region known to be associated with that CD or DVD, such as for example region code 1, US/Canada only, (10) a list price known to be associated with that CD or DVD, such as for example the list price $24.98, (11) a product image known to be associated with that CD or DVD, such as for example an image of cover art represented by a BMP file or a GIF file, and (12) possibly other information necessary or desirable to distinguish the product from others that might be similar. In this example, not intended to be limiting in any way, this particular CD or DVD would have a system generated unique product ID of 231 235.

In one embodiment, ISBN values are used to identify books.

As part of this step, the requests to each seller subsystem 130 include information sufficient for that seller subsystem 130 to search its own database of products for the unique product desired by the buyer.

In one embodiment, when the search is for a book, the search subsystem 140 provides the ISBN to the seller subsystem 130, with the effect that the seller subsystem 130 is capable of locating the unique book.

When the search is for a CD or DVD, or other product, the search subsystem 140 uses its own system generated unique product ID to find information associated with that product from its own database, and provides that information to the seller subsystem 130 in association with the search request. This has the effect that the seller subsystem 130 is capable of performing an independent search of its own database, and thus has the effect the seller subsystem 130 is capable of locating the unique CD or DVD, or other product. For example, not intended to be limiting in any way, in the case of a CD or DVD, substantially all seller subsystems 130 provide for search in response to the 3-tuple of information {title, actor, director}. This has the effect that the search subsystem 140 is capable of providing that 3-tuple of information to the seller subsystem 130, and the seller subsystem 130 is capable of providing pricing information for a set of CDs or DVDs having those attributes.

As part of this step, the search subsystem 140 performs the following sub-steps:

At a sub-step 211(*a*), the results of search from each seller subsystem 130 are matched by the search subsystem 140 against the information associated with that product from its own database.

At a sub-step 211(*b*), the search subsystem 140 computes a degree-of-match value in response to the match attempt. In one embodiment, the degree-of-match value is responsive to each piece of information associated with that CD or DVD, with the effect that the search subsystem 140 is capable of computing a "fuzzy" value (such as for example known in the art of fuzzy logic) quantifying the degree-of-match between the database entry, from the seller subsystem 130 with the database entry from the search subsystem 140.

At a sub-step 211(*c*), the search subsystem 140 compares the degree-of-match value with a selected threshold value. For one example, not intended to be limiting in any way, in one embodiment the selected threshold value might be a 70% degree-of-match value or better. If the actual degree-of-match value is greater than the selected threshold (for example, 80%, which is >70%), the search subsystem 140 considers the result a search hit, with the effect that it obtains pricing information from the seller subsystem 130 and incorporates that pricing information into its aggregated search results. If the actual degree-of-match value is less than the selected threshold (for example, 60%, which is 70%), the search subsystem 140 considers the result a search miss (that is, not a search hit), with the effect that it does not obtain pricing information from that seller subsystem 130 and does not incorporate any pricing information from that seller subsystem 130 into its aggregated search results.

At a step 212, the search subsystem 140 updates its product database 143 with pricing information received from the seller subsystems 130. This step might be performed in parallel or concurrently with the previous step, as each seller subsystem 130 might respond within a different response time.

At a step 213, the search subsystem 140 sends requests to each seller subsystem 130, requesting discount information for each discount known to the search subsystem 140. As part of this step, if the search subsystem 140 is aware that only a subset of those discounts are available at a particular seller subsystem 130, the search subsystem 140 only requests that particular seller subsystem 130 for discount information for that subset of discounts.

In one embodiment, discount information includes at least some of the following:

- identifiers for the particular potential seller 131, the particular discount (such as for example a primary key associated with the discount database 144), and an identifier for that discount at the seller subsystem 130 (such as for, example a coupon code or a confirmation password for the discount);
- information about that particular discount, including a minimum purchase order size, a fixed amount of price reduction (such as for example, "$5 off"), a percentage amount of price reduction (such as for example, "10% off");
- information about restrictions on, that discount (such as for example whether it is restricted to a particular product or class of products, or whether the discount relates to new or used books); and
- information about how to use the discount at the seller subsystem 1300 (such as for example a URL for activation of the discount).

At a step 214, the search subsystem 140 updates its discount database 143 with discount information received from the seller subsystems 130. This step might be performed in parallel or concurrently with the previous step, as each seller subsystem 130 might respond within a different response time.

At a step 215, the search subsystem 140 receives any additional discount information from an operator available at the search subsystem 140, such as for example an individual tasked with searching the Internet for discount information and entering that information into the search subsystem 140. As part of this step, the search subsystem 140 updates its discount database 143 with discount information received from the operator.

At a flow point 210B, the search subsystem 140 has pre-populated its product database 143 and its discount database 144, and is ready to proceed with another action.

Matching Discounts to Products

At a flow point 220A, the Search subsystem 140 is ready to match particular discounts with particular products.

At a step 221, the search subsystem 140 loops over each potential seller 131, determining which discounts in the discount database 144 are applicable to which products in the product database 143, and which discount in the discount database 144 is the "best" discount for each product in the product database 143. In some cases, it might occur that there is more than one "best" discount for a particular product, because the choice of "best" discount depends on some aspect of the potential buyer 121 (such, as for example where the potential buyer 121 resides) or some aspect of the order placed by the potential buyer 121 (such as for example an order size).

At a step 222, the Search subsystem 140 associates the (one or more) "best" discount(s) in the discount database 144 with each product in the product database 143.

At a flow point 220B, the search subsystem 140 has matched particular discounts with particular products, and is ready to proceed with another action.

Searching on Behalf of the Buyer

At a flow point 230A, the buyer subsystem 120 is ready to process a request to search for a best price for one or more selected products.

At a step 231, the buyer subsystem 120 receives information from the potential buyer 121 regarding one or more selected products to search.

At a step 232, the buyer subsystem 120 sends a request to the search subsystem 140 including relevant information obtained from the potential buyer 121.

At a step 233, the search subsystem 140 matches the one or more selected products to search against its product database 143. To perform this step, the search subsystem 140 performs the following sub-steps:

At a sub-step 233(*a*), the search subsystem 140 retrieves information regarding potential sellers 131 for, those one or more selected products. As part of this sub-step, the information regarding potential sellers 131 includes pricing information for those one or more selected products, as obtained from that seller subsystem 130.

At a sub-step 233(*b*), the search subsystem 140 determines if the TTL for the pricing information indicates that the pricing information has expired or should be refreshed. If not, the method 200 proceeds with the next step. If so, the method 200 proceeds with the rest of the sub-steps for this step.

At a sub-step 233(c), the search subsystem 140 re-contacts the seller subsystem 130 and obtains fresh pricing information. As part of this sub-step, the search subsystem 140 updates its product database 143.

At a sub-step 233(d), the search subsystem 140 determines if the TTL for the discount information indicates that the discount information has expired or should be refreshed. If not, the method 200 proceeds with the sub-step 233(f). If so, the method 200 proceeds with the next sub-step for this step.

At a sub-step 233(e), the search subsystem 140 re-contacts the seller subsystem 130 and obtains fresh discount information. As part of this sub-step, the search subsystem 140 updates its, discount database 144.

At a sub-step 233(f), the search subsystem 140 re-performs the steps between the flow points 22oA and 22oB, with the effect that the fresh pricing information and the fresh discount information are re-matched and the "best" discount is reassociated with the product.

At a step 234, the search subsystem 140 responds to the buyer subsystem 120 with a set of potential sellers 131, along with each one's associated pricing information and "best" discount. As part of this step, the search subsystem 140 computes the effective price for each potential seller 131 (for each of the products).

At a step 235, the buyer subsystem 120 presents the information it received in the previous step to the potential buyer 121. In one embodiment, the buyer subsystem 120 presents that information in tabular form, sorted by effective price, with the lowest effective price first.

At a flow point 230B, the buyer subsystem 120 has processed a request to search for a best price for one or more selected products, and is ready to proceed with another action.

Method of Operation (High-Speed Search)

Figure 3:
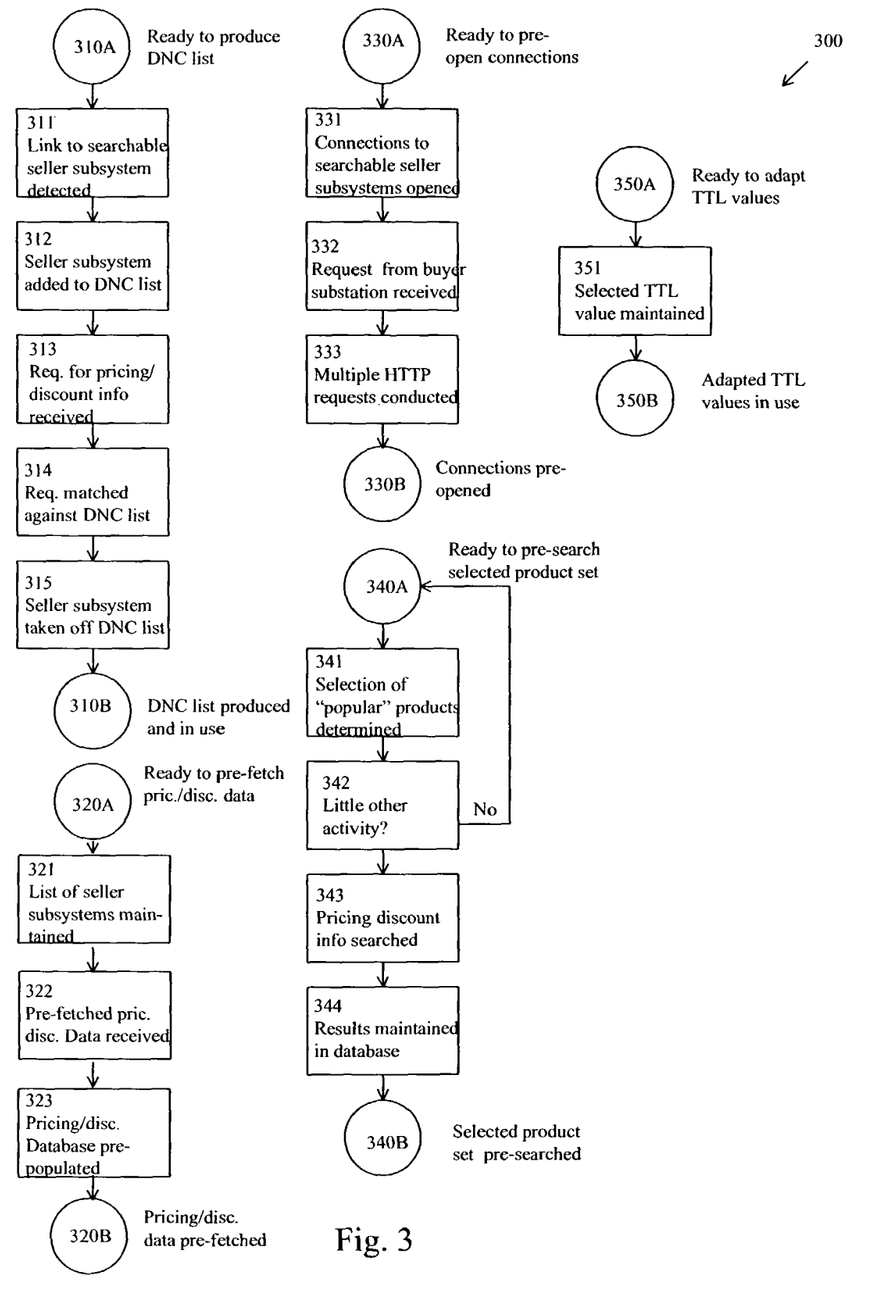
FIG. 3 shows a process flow diagram of a method including operation of a system including a high-speed web crawler associated with a best price search engine.

FIG. 3 shows a process flow diagram of a method including operation of a system including a high-speed web crawler associated with a best price search engine.

Although described serially, the flow points and method steps of the method 300 can be, and preferably are, performed by separate elements concurrently, in conjunction, or in parallel, whether asynchronously or synchronously, in a pipelined manner, or otherwise. In the context of the invention, there is no particular requirement that the method must be performed in the same order in which this description lists flow points or method steps, except where explicitly so stated.

In one embodiment, the system includes a high-speed web crawler, capable of minimizing the amount of time involved in search while concurrently obtaining a best-quality search within those constraints.

Dead Link Detection

At a flow point 310A, the search subsystem 140 is ready to produce a "do not crawl" list.

At a step 311, the search subsystem 140 detects a link to a searchable seller subsystem 130 that is slower than a selected threshold duration. In one embodiment, this threshold duration might be set to a value such as for example about 10 minutes, with the effect that any seller subsystem 130 that takes longer than the threshold duration would be considered by the search subsystem 140 to be a "dead link" (or a very slow link).

At a step 312, the search subsystem 140 adds the seller subsystem 130 for which the search subsystem 140 considered to be a "dead link" (or a very slow link) to a "do not crawl" list. The search subsystem 140 sets a TTL (time to live) value for that particular seller subsystem 130, such as for example about 30 minutes.

At a step 313, the search subsystem 140 receives a request from a buyer subsystem 120, requesting a search of pricing and discount information from seller subsystems 130.

At a step 314, the search subsystem 140 matches the request from the previous step against its "do not crawl" list. If the seller subsystem 130 for which the search subsystem 140 considered to be a "dead link" (or a very slow link) is on the "do not crawl" list, and the TTL for that particular seller subsystem 130 has not timed out, the search subsystem 140 skips that seller subsystem 130 for any search requests. If the TTL for that particular seller subsystem 130 has timed out, the search subsystem 140 retries that seller subsystem 130 for any search requests, even if it is already on the "do not crawl" list.

At a step 315, if the search subsystem 140 retried a particular seller subsystem 130 in the previous step, even if it is already on the "do not crawl" list, and that particular seller subsystem 130 responded within a reasonable time (such as for example 10 minutes), the search subsystem 140 takes that particular seller subsystem 130 off the "do not crawl" list.

At a flow point 310B, the search subsystem 140 has produced (and is using) a "do not crawl" list, and is ready to proceed with another action.

Pre-Fetching Pricing and Discount Data

At a flow point 320A, the search subsystem 140 is ready to pre-fetch pricing and discount data.

At a step 321, the search subsystem 140 maintains a list of seller subsystems 130 willing to provide pricing or discount data in advance of an actual search, such as for example seller subsystems 130 that are willing to provide daily (or more frequent) pricing updates for a substantial portion of their searchable database.

At a step 322, the search subsystem 140 receives pre-fetched pricing or discount data from those seller subsystems 130, in advance of an actual search.

At a step 323, the search subsystem 140 pre-populates a pricing database and a discount database with that pre-fetched pricing or discount data.

At a flow point 320B, the search subsystem 140 has pre-fetched (and is using) pricing and discount data, and is ready to proceed with another action.

Pre-Opened Connections

At a flow point 330A, the search subsystem 140 is ready to pre-open connections to searchable seller subsystems 130.

At a step 331, the search subsystem 140 opens connections to searchable seller subsystems 130, in advance of receiving any search requests from a buyer subsystem 120. In one embodiment, these pre-opened connections include open TCP/IP sockets and persistent HTTP connections. In one embodiment, pre-opened connections include at least: (a) pre-fetched DNS information, (b) pre-opened TCP/IP sockets, and (c) pre-opened TCP/IP connections. In one embodiment, the high-speed web crawler includes a cluster of several (in one embodiment, more than 10) devices, with the effect that the high-speed web crawler is capable of conducting searches of multiple sellers in parallel.

At a step 332, similar to the step 313, the search subsystem 140 receives a request from a buyer subsystem 120, requesting a search of pricing and discount information from seller subsystems 130.

At a step 333, the search subsystem 140 conducts multiple HTTP requests with searchable seller subsystems 130, concurrently or in parallel, with the effect of substantially reducing aggregate search response time.

At a flow point 330B, the search subsystem 140 has pre-opened (and is using) connections to searchable seller subsystems 130, and is ready to proceed with another action.

Pre-Searched Products

At a flow point 340A, the search subsystem 140 is ready to pre-search a selected set of products.

At a step 341, the search subsystem 140 determines a selection of "popular" products, that is, products for which the most searches have been requested by buyers in a recent time duration. In one embodiment, the number of such products is about 10,000, and the time duration is about 24 hours.

At a step 342, the search subsystem 140 determines if there is little other activity, such as for example at night or at other times of low traffic. If not, after a selected time duration (such as for example 4 hours), the search subsystem 140 returns to the flow point 340A to try to pre-search products again. In one embodiment, the search subsystem 140 forces the determination that there is little other activity to a logical "yes" at a selected time at night, such as for example 3:00 a.m.

At a step 343, the search subsystem 140 searches pricing information and discount information for those popular products, even though not triggered by any explicit request from a buyer subsystem 120.

At a step 344, the search subsystem 140 maintains results from the previous step in a relatively local database for substantially immediate response. In one embodiment, the most popular 10,000 books are pre-searched overnight, with the effect that prices and discounts are available for those most popular 10,000 books each morning without further search.

At a flow point 340B, the search subsystem 140 has pre-search a selected set of products, and is ready to use pricing and discount information obtained from that pre-search, and is also ready to proceed with another action.

Adaptive TTL for Selected Sellers

At a flow point 350A, the search subsystem 140 is ready to adapt ties for selected seller subsystems 130.

At a step 351, the search subsystem 140 maintains a selected TTL value for pricing and discount information for each searchable seller independently, with the effect that searchable sellers who update their prices more frequently are searched more frequently, and with the effect that searchable sellers who update their prices less frequently are searched less frequently.

The inventors have found that TTL values for pricing are a useful proxy for alacrity of response from the seller. The high-speed web crawler maintains non-expired pricing and discount information in a relatively local database for substantially immediate response, with the effect that non-expired pricing and discount information need not be further searched at all.

At a flow point 350B, the search subsystem 140 has is using adapted TTL values for selected seller subsystems 130, and is ready to proceed with another action.

Alternative Embodiments

Although preferred embodiments are disclosed herein, many variations are possible which remain within the concept, scope, and spirit of the invention. These variations would become, clear to those skilled in the art after perusal of this application.

Searching for not necessarily identical products or services, where the features of each product or service might be comparable, and where it is possible to determine the effective price for a product or service having a minimal set of features desired by the potential buyer. For example, not intended to be limiting in any way, cellular phones might be identifiable by their features, and a first model cellular phone having features A, B, and C, and an effective cost of $50, would be preferable to a second model cellular phone having features A, B, C, and D, and an effective cost of $75, where the potential buyer has indicated lack of interest in feature D. This would have the effect that purchasing the first model would be least effective cost for the purposes of that specific potential buyer.

Searching for packages of multiple products or services, where the search is tailored to a combined effective price that is minimized for the entire package. For example, not intended to be limiting in any way, a set of books A, B, and C, might be available at a single location at a stated price of $100 with a discount for purchases over $80 of 10% and free shipping for more than 2 books, for an effective combined price of $90, while the individual books might be available for less at other sellers, but with a combined price (for the minimum effective price of A individually, the minimum effective price of B individually, and the minimum effective price of C individually) of $80, but with no volume discount and total shipping charges of $12, for an combined effective price of $92. This would have the effect that purchasing all 3 books at one location is less expensive than purchasing them individually at their least cost apiece.

Although described primarily with regard to books and CDs, a primarily with regard to price searching, the invention is not limited to those specific products, features, or those implementations described herein.

Those skilled in the art will recognize, after perusal of this application, that these alternative embodiments are illustrative and in no way limiting.

The invention claimed is:

1. A method, comprising:
    determining a connection parameter related to affecting time involved in searching information relating to prices by sellers using a processor;
    searching in response to the connection parameter so as to reduce search time for multi-variable information relating to prices by sellers of a selected product, wherein that multi-variable information includes at least two of the following:
        a stated price, a coupon, discount applicable to the selected product, a currency exchange rate, a measure of quality for an available item of that selected product, a measure of reputation for a selected seller, manufacturer of that selected product, a shipping cost and type a tax imposed on purchase of the selected product;
    populating a database with that multi-variable information in response to said searching;
    computing at a web server an effective price in response to that multi-variable information; and
    presenting that effective price in association with that selected product.

2. A method, comprising:
    determining the connection parameter related to affecting time involved in searching information relating to prices by sellers, said parameter including pre-fetched information;

searching in responsive to the one connection parameter so as to reduce search time, for stated prices provided by sellers of a selected product;

applying those discounts to those stated prices, whereby an effective price can be computed; and presenting that effective price in association with that selected product.

3. The method as in claim 1 or 2, further comprising:

aggregating the information regarding sellers offering the selected product; and presenting to a potential buyer that aggregated information.

4. The method as in claim 1 or 2, further comprising:

filtering information regarding sellers of offering the selected product in response to at least one restriction selected by a potential buyer.

5. The method as in claim 1 or 2, further comprising:

obtaining at least some of the multi-variable information from a source other than a potential seller of that selected product.

6. The method as in claim 1 or 2, further comprising:

sorting information regarding sellers of offering the selected product in response to that effective price.

7. The method as in claim 1 or 2, wherein a search restriction is selected by a potential buyer, that search restriction including at least one of:

a maximum effective price a minimum measure of quality, a minimum measure of reputation, a minimum shipping type and a maximum amount of product ordered.

8. The method as in claim 1 or 2, wherein at least some of that multi-variable information is entered from an offline source.

9. The method as in claim 1 or 2, wherein the steps of searching for multi-variable information further comprising:

searching for a first element of that the multi-variable information; and searching independently of those steps of searching for a first element, for a second element of that multi-variable information.

10. The method as in claim 1 or 2, wherein those discounts include at least one of a fixed reduction in price, a percentage reduction in price and a reduction in price contingent on an amount of product ordered.

11. The method as in claim 1 or 2, wherein those discounts include at least one of a reduction in shipping cost and an upgrade in shipping type with-out associated increase in price, and wherein those discounts are at least one of unconditional and conditional on an amount of product ordered.

12. The method as in claim 1 or 2, wherein those steps of searching also include information relating to packages of products including the selected product; and wherein the computed effective price is responsive to a minimum effective price for those packages of products.

13. The method as in claim 1 or 2, wherein those steps of searching also include information relating to products not exactly equal to the selected product.

14. The method as in claim 1 or 2, wherein the connection parameter comprises connection reliability information.

15. The method as in claim 1 or 2, wherein the connection parameter comprises number of transaction information.

16. The method as in claim 1 or 2, wherein the connection parameter comprises a frequency of transaction with the seller.

17. The method as in claim 1 or 2, further including: caching the multi-variable information and the connection parameter before receiving a request from a user to present the effective price.

18. The methods as in claim 1 or 2, wherein the information relating to products not exactly equal to the selected product is responsive to a degree-of-match parameter.

19. The method of claim 1 wherein the connection parameter is a dead link indication.

20. The method of claim 1 wherein the connection parameter includes multiple connection information.

21. The method of claim 1 wherein the connection parameter includes pre-opened connection information.

22. The method of claim 2 wherein the pre-fetched information includes a pre-fetched price.

23. The method of claim 2 wherein the pre-fetched information includes pre-searched products.

\* \* \* \* \*